United States Patent
Kim et al.

(10) Patent No.: US 8,098,353 B2
(45) Date of Patent: Jan. 17, 2012

(54) LIQUID CRYSTAL DISPLAY WITH IMPROVED RESPONSE SPEED AND APERTURE RATIO

(75) Inventors: Hoon Kim, Ansan-si (KR); Ji-Won Sohn, Seoul (KR); Seung-Beom Park, Seoul (KR); Yoon-Sung Um, Yongin-si (KR); Jin-Won Park, Suwon-si (KR); Hye-Ran Yoo, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 582 days.

(21) Appl. No.: 12/187,683

(22) Filed: Aug. 7, 2008

(65) Prior Publication Data

US 2009/0040448 A1 Feb. 12, 2009

(30) Foreign Application Priority Data

Aug. 7, 2007 (KR) .................. 10-2007-0079041

(51) Int. Cl.
*G02F 1/1337* (2006.01)
*G02F 1/1343* (2006.01)
(52) U.S. Cl. .................. 349/129; 349/139
(58) Field of Classification Search .......... 349/129, 349/139, 138
See application file for complete search history.

(56) References Cited

U.S. PATENT DOCUMENTS

| 6,750,934 | B2 | 6/2004 | Sakamoto et al. | |
|---|---|---|---|---|
| 6,888,602 | B2 * | 5/2005 | Takeda et al. | 349/141 |
| 6,940,573 | B2 * | 9/2005 | Um et al. | 349/129 |
| 7,006,185 | B2 | 2/2006 | Kim et al. | |
| 7,064,801 | B2 | 6/2006 | Kubo et al. | |
| 7,084,947 | B2 | 8/2006 | Miyachi et al. | |
| 2004/0207788 | A1 * | 10/2004 | Yamaguchi et al. | 349/130 |
| 2005/0219186 | A1 | 10/2005 | Kamada et al. | |
| 2005/0231674 | A1 * | 10/2005 | Nishimura | 349/139 |
| 2005/0237461 | A1 * | 10/2005 | Choi et al. | 349/129 |

FOREIGN PATENT DOCUMENTS

| JP | 07020497 | 1/1995 |
|---|---|---|
| JP | 2001083522 | 3/2001 |
| JP | 2001174821 | 6/2001 |
| JP | 2002055347 | 2/2002 |
| JP | 2002107748 | 4/2002 |
| JP | 2002229029 | 8/2002 |
| JP | 2004302386 | 10/2004 |
| JP | 2005189476 | 7/2005 |
| JP | 2005292523 | 10/2005 |
| KR | 100357683 | 10/2002 |
| KR | 1020040001972 | 1/2004 |
| KR | 1020050025071 | 3/2005 |
| KR | 1020060001028 | 1/2006 |

* cited by examiner

*Primary Examiner* — Thoi Duong
(74) *Attorney, Agent, or Firm* — Cantor Colburn LLP

(57) ABSTRACT

A liquid crystal display includes; a gate line, a data line disposed substantially perpendicular to the gate line, a switching element connected to the gate line and the data line, a pixel electrode connected to the switching element, and having a first inclination direction determining member including at least one first oblique portion forming an oblique angle with the gate line and the data line, and an inclination direction assistance member disposed adjacent to the first inclination direction determining member, and substantially parallel to the first oblique portion.

10 Claims, 9 Drawing Sheets

LIQUID CRYSTAL DISPLAY WITH IMPROVED RESPONSE SPEED AND APERTURE RATIO

This application claims priority to Korean Patent Application No. 10-2007-0079041, filed on Aug. 7, 2007, and all the benefits accruing therefrom under 35 U.S.C. §119, the contents of which in its entirety are herein incorporated by reference.

BACKGROUND OF THE INVENTION (a) Field of the Invention

The present invention relates to a liquid crystal display and more particularly, to a liquid crystal display having an improved response speed and aperture ratio.

(b) Description of the Related Art

Liquid crystal displays ("LCDs") are one of the most widely used flat panel displays, and an LCD includes a pair of panels provided with field-generating electrodes, such as pixel electrodes and a common electrode, and a liquid crystal ("LC") layer interposed between the two panels. The LCD displays images by applying voltages to the field-generating electrodes to generate an electric field in the LC layer that determines the orientations of LC molecules therein to adjust polarization of incident light.

An LCD also includes switching elements connected to the respective pixel electrodes and a plurality of signal lines such as gate lines and data lines for controlling the switching elements and thereby applying voltages to the pixel electrodes. The degree of orientation of LC molecules in the LC layer may be varied by applying voltages of various magnitudes to the pixel electrodes. When the LC molecules in a pixel are oriented so that the polarization of incident light is perpendicular to the polarization of a polarizer, that pixel of the LCD will display black; when the LC molecules in a pixel are oriented so that the polarization of incident light is parallel to the polarization of the polarizer, that pixel of the LCD will display white; when the LC molecules are oriented somewhere between a perpendicular and a parallel alignment, the pixel will display a gray. A typical LCD has a plurality of discreet gray levels corresponding to orientations of the LC molecules between the black and white displays.

Among the LCDs, a vertical alignment ("VA") mode LCD, which aligns LC molecules such that the long axes of the LC molecules are perpendicular to the panels in the absence of an electric field, has become increasingly popular because of its high contrast ratio and wide reference viewing angle. A wide reference viewing angle is defined as a viewing angle that makes the contrast ratio equal to about 1:10 or as a limit angle for inversion in luminance between the gray levels.

The wide viewing angle of the VA mode LCD can be realized by cutouts in the field-generating electrodes and protrusions on the field-generating electrodes. Since the cutouts and protrusions can determine tilt directions of the LC molecules, the tilt directions can be distributed in several directions by using the cutouts and protrusions such that a reference viewing angle is widened.

However, because it is difficult for light to pass through the portion where the cutouts and protrusions are disposed, these may cause a decrease of the aperture ratio of the LCD. To increase the aperture ratio, an interval between the cutouts or the protrusions may be maximized. However, the liquid crystal molecules that are disposed on the central portion of the region between the cutouts or the protrusions are only slightly influenced by the horizontal electric field formed by the cutouts and the protrusions such that the arrangements of the liquid crystal molecules are scattered. Accordingly, a texture or light leakage is generated, and the response time is increased.

BRIEF SUMMARY OF THE INVENTION

The present invention provides a liquid crystal display ("LCD") with an improved response speed and aperture ratio.

An exemplary embodiment of a liquid crystal display ("LCD") according to the present invention includes; a gate line, a data line disposed substantially perpendicular to the gate line, a switching element connected to the gate line and the data line, a pixel electrode connected to the switching element, and having a first inclination direction determining member including at least one first oblique portion forming an oblique angle with the gate line and the data line, and an inclination direction assistance member disposed adjacent to the first inclination direction determining member, and substantially parallel to the first oblique portion.

In one exemplary embodiment, the inclination direction assistance member may include a step portion formed in the pixel electrode.

In one exemplary embodiment, an insulating layer may be disposed between the data line and the pixel electrode, and the inclination direction assistance member may include a recess portion formed in the insulating layer and corresponding to the step portion of the pixel electrode.

In one exemplary embodiment, the width of the recess portion is about 4 µm to about 8 µm.

In one exemplary embodiment, the depth of the recess portion may be about 500 Å to about 2500 Å.

In one exemplary embodiment, a common electrode disposed substantially opposite to the pixel electrode may be further included, and the common electrode may include a second inclination direction determining member having at least one second oblique portion substantially parallel to the first oblique portion and disposed substantially opposite to the first inclination direction determining member with respect to the inclination direction assistance member.

In one exemplary embodiment, the horizontal distance between the first inclination direction determining member and the second inclination direction determining member may be substantially equal to or greater than about 40 µm.

In one exemplary embodiment, the ratio of the distance between the second inclination direction determining member and the inclination direction assistance member to the distance between the first inclination direction determining member and the inclination direction assistance member may be from about 1:3 to about 1:1.

In one exemplary embodiment, the horizontal distance between the inclination direction assistance member and the first inclination direction determining member may be smaller than the horizontal distance between the inclination direction assistance member and the second inclination direction determining member.

In one exemplary embodiment, the ratio of the horizontal distance between the second inclination direction determining member and the inclination direction assistance member to the horizontal distance between the first inclination direction determining member and the inclination direction assistance member ranges from about 1:1 to about 3:1.

A method of increasing an aperture ratio and response speed of a liquid crystal display includes; disposing a gate line on a substrate, disposing a data line substantially perpendicular to the gate line, disposing a switching element in connection with the gate line and the data line, disposing a pixel electrode in connection with the switching element, and having a first inclination direction determining member comprising at least one first oblique portion forming an oblique angle with the gate line and the data line, and forming an inclination direction assistance member adjacent to the first inclination direction determining member, and substantially parallel to the first oblique portion.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
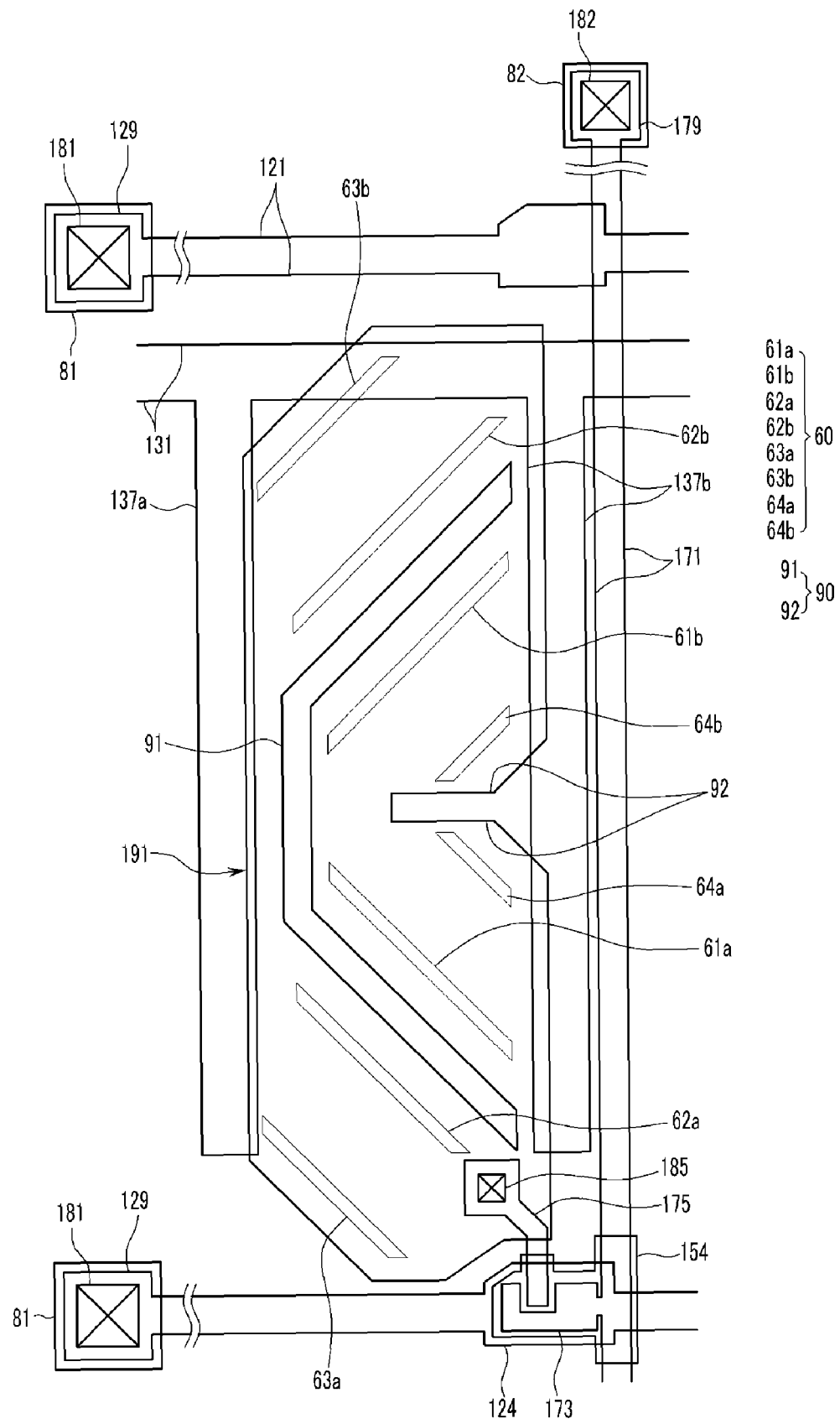
FIG. 1 is a layout view of an exemplary embodiment of a lower panel for an exemplary embodiment of a liquid crystal display ("LCD") according to the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, the exemplary embodiments of the present invention will be explained in further detail with reference to the accompanying drawings.

Figure 2:
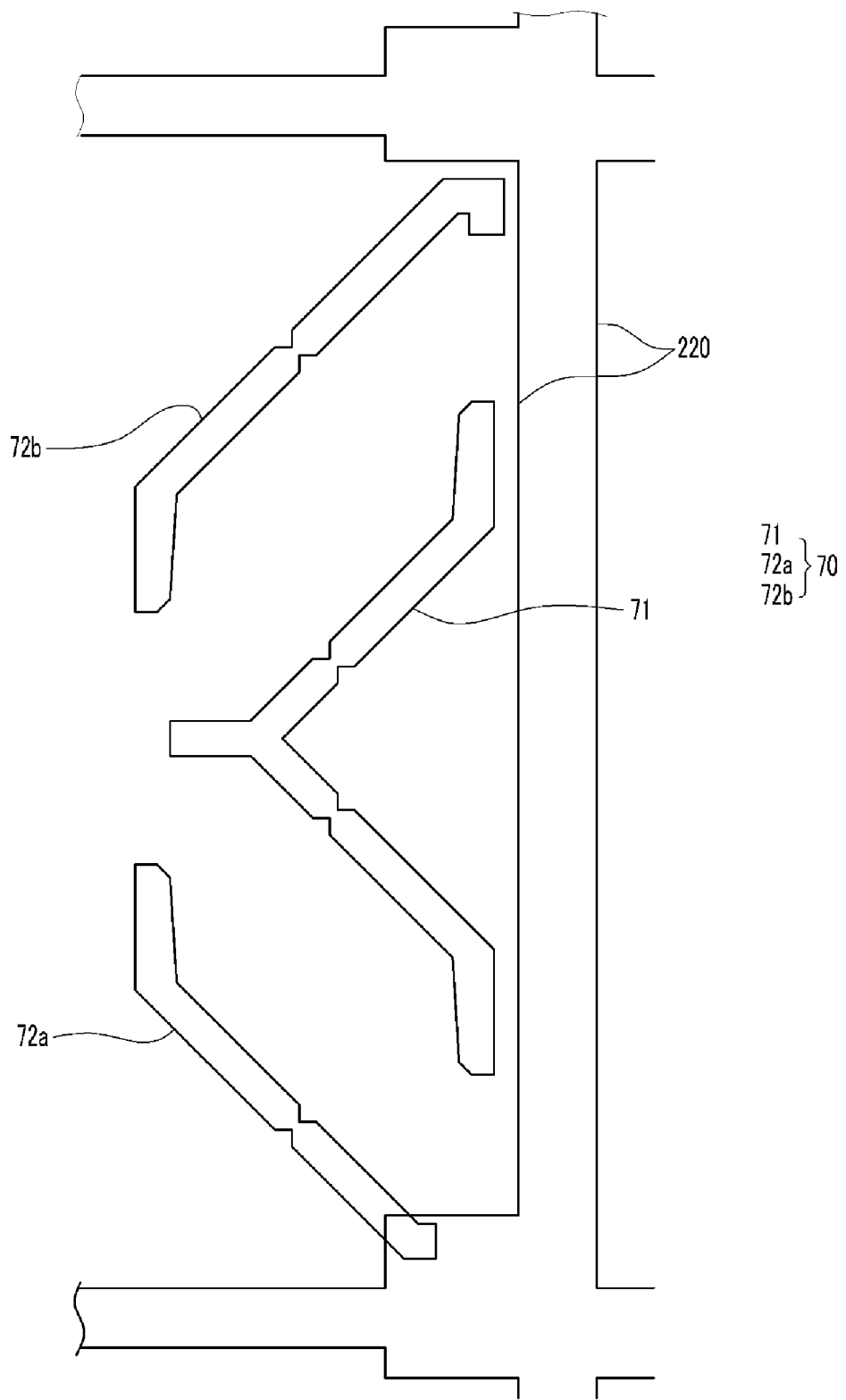
FIG. 2 is a layout view of an exemplary embodiment of an upper panel for an exemplary embodiment of an LCD according to the present invention.
Figure 3:
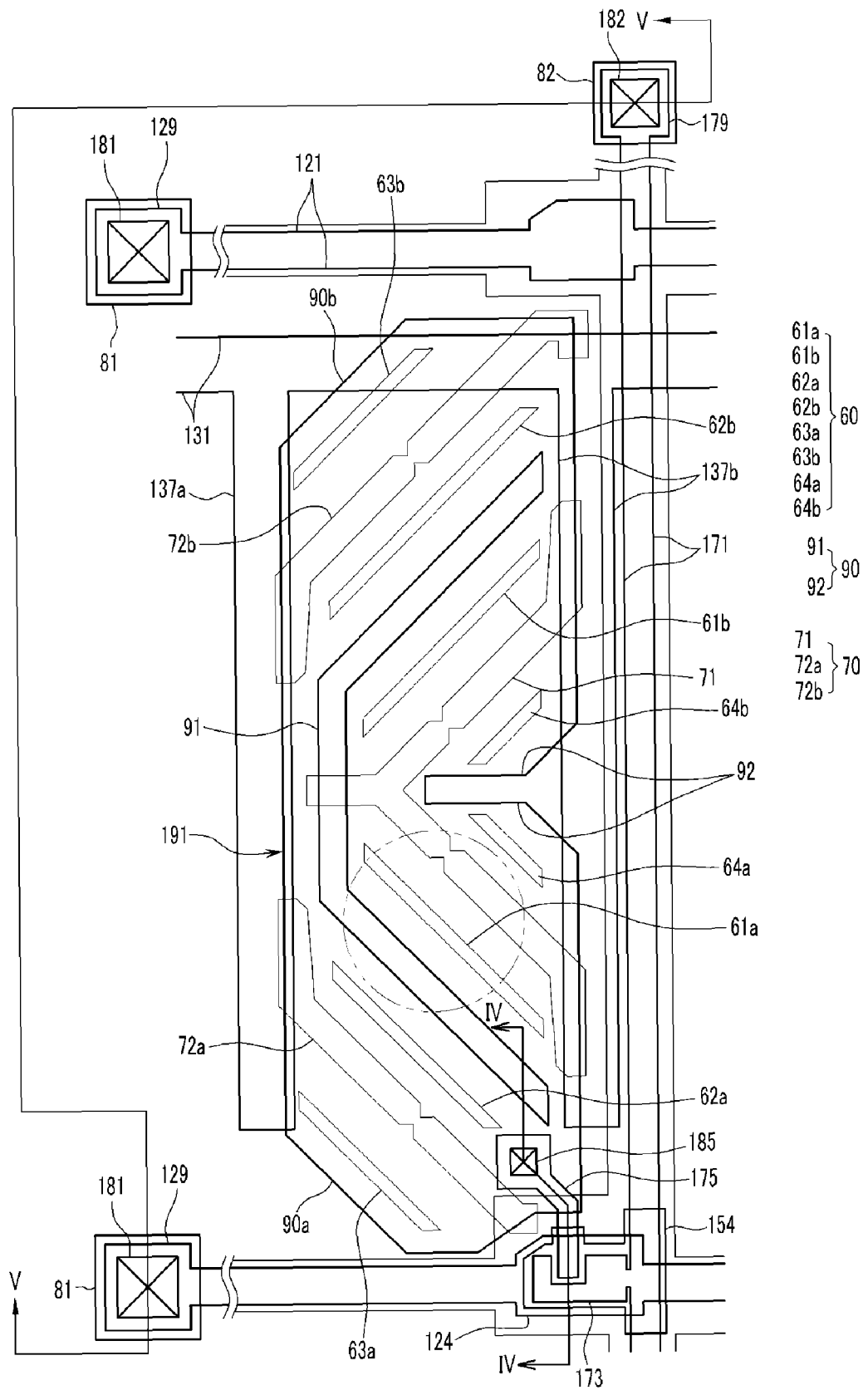
FIG. 3 is a layout view of an exemplary embodiment of an LCD including the exemplary embodiments of a lower panel shown in FIG. 1 and the exemplary embodiment of an upper panel shown in FIG. 2.
Figure 4:
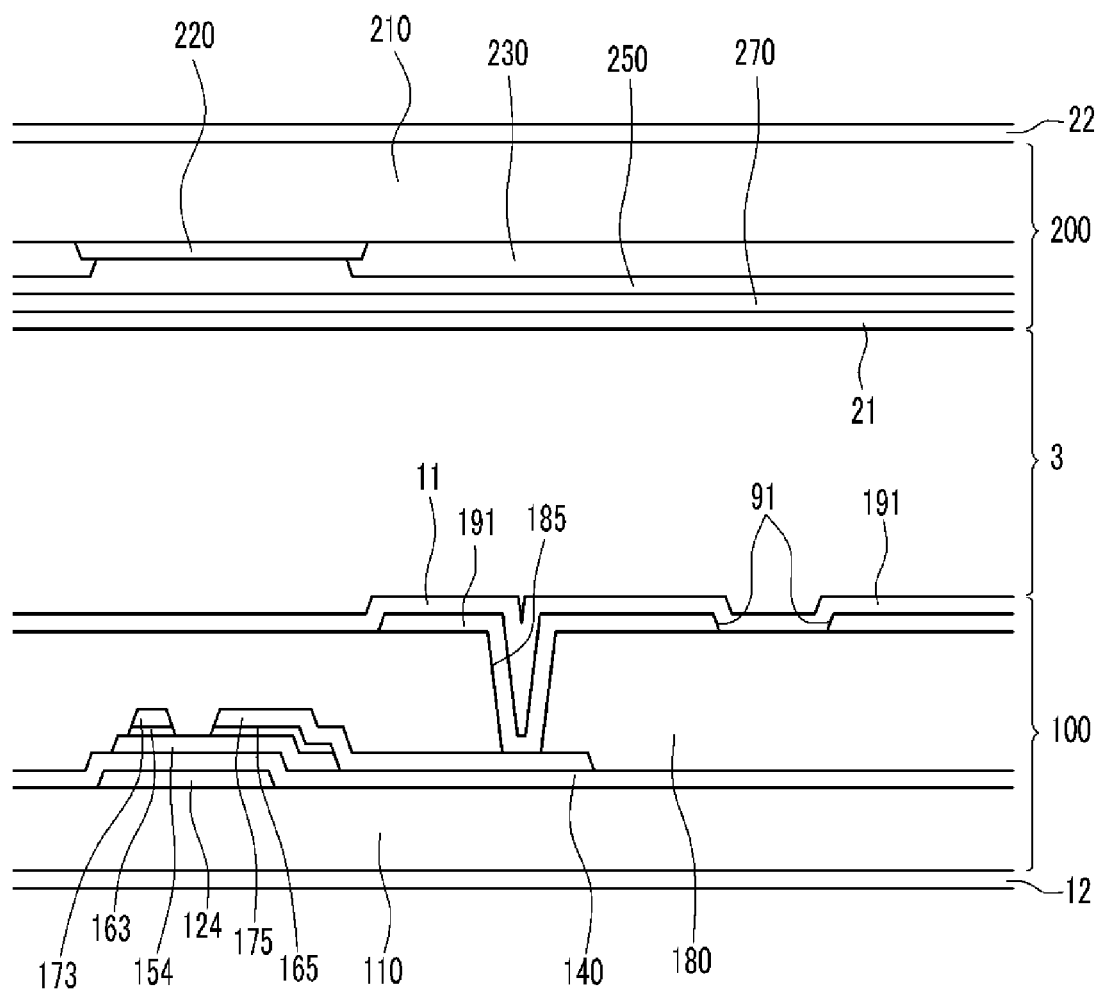
FIG. 4 and FIG. 5 are cross-sectional views of the exemplary embodiment of an LCD shown in FIG. 3 taken along lines IV-IV and V-V, respectively.
Figure 5:
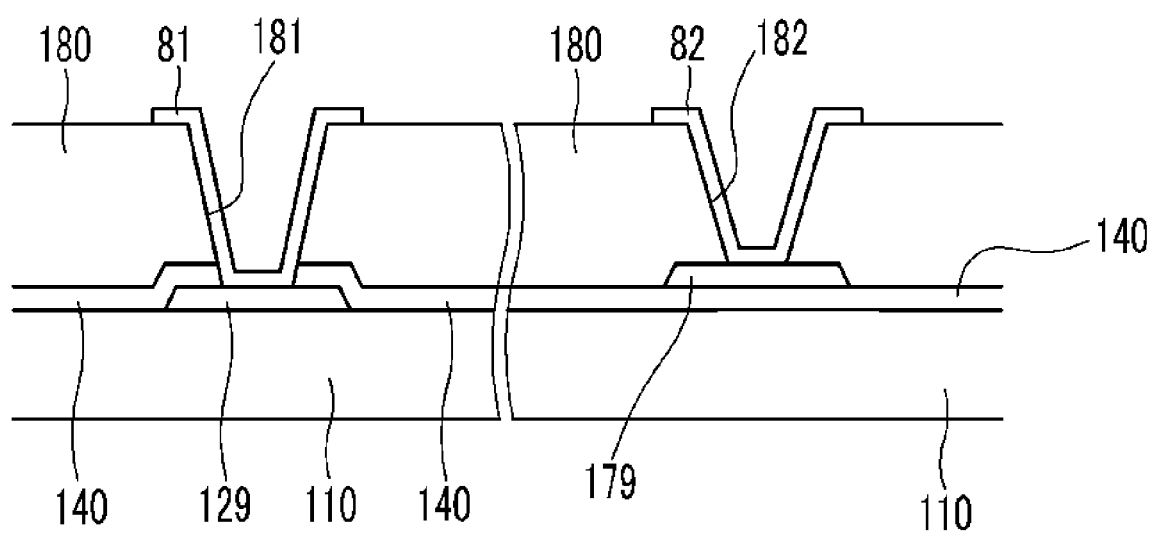

FIG. 1 is a layout view of an exemplary embodiment of a lower panel for an exemplary embodiment of a liquid crystal display ("LCD") according to the present invention, FIG. 2 is a layout view of an exemplary embodiment of an upper panel for an exemplary embodiment of an LCD according to the present invention, FIG. 3 is a layout view of an exemplary embodiment of an LCD including the exemplary embodiment of a lower panel shown in FIG. 1 and the exemplary embodiment of an upper panel shown in FIG. 2, and FIG. 4 and FIG. 5 are cross-sectional views of the exemplary embodiment of an LCD shown in FIG. 3 taken along lines IV-IV and V-V, respectively.

Referring to FIGS. 1 to 4, an exemplary embodiment of an LCD according to the present invention includes a lower panel 100 and an upper panel 200 opposing the lower panel 100, and a liquid crystal layer 3 interposed between the two panels 100 and 200.

First, the lower panel 100 will be described in detail with reference to FIG. 1, FIG. 3, FIG. 4 and FIG. 5.

A plurality of gate lines 121 and a plurality of storage electrode lines 131 are formed on an insulating substrate 110, one exemplary embodiment of which is made of transparent glass or plastic.

The gate lines 121, which are separated from each other, extend substantially in a transverse direction and transmit gate signals. Each gate line 121 includes a plurality of gate electrodes 124 protruding from the gate line 121, and an end portion 129 having a large area for connection with another layer or an external driving circuit (not shown). A gate driving circuit (not shown) for generating the gate signals may be mounted on a flexible printed circuit ("FPC") film (not shown), which may be attached to the substrate 110, directly mounted on the substrate 110, or integrated with the substrate 110. Alternative exemplary embodiments include configurations wherein the gate lines 121 may extend to be connected to a driving circuit that may be integrated with the substrate 110 and the end portion 129 may be omitted.

The storage electrode lines 131 extend substantially in a transverse direction and are substantially parallel to the gate lines 121, and are supplied with a predetermined voltage. Each storage electrode line 131 includes a stem line and a plurality of first and second storage electrodes 137a and 137b branched from the stem line. Each storage electrode line 131 is disposed between two neighboring gate lines 121. The first and second storage electrodes 137a and 137b are extended in a substantially vertical direction and substantially opposite to each other. However, alternative exemplary embodiments include the shapes of the storage electrode lines 131 may be variously changed.

A gate insulating layer 140, exemplary embodiments of which may be made of silicon nitride SiNx or silicon oxide SiOx, is formed on the gate lines 121 and the storage electrode lines 131.

A plurality of semiconductor islands 154, exemplary embodiments of which may be made of a hydrogenated amorphous silicon a-Si, a polysilicon, or an organic semiconductor, is formed on the gate insulating layer 140. The semiconductor islands 154 are disposed on the gate electrodes 124.

A pair of ohmic contact islands 163 and 165 is formed on the semiconductor islands 154. Exemplary embodiments of the ohmic contacts 163 and 165 can be made of a material such as n+ hydrogenated amorphous silicon with an n-type impurity, such as phosphor doped at high concentration and silicide.

A plurality of data conductors including a plurality of data lines 171 and a plurality of drain electrodes 175 are formed on the ohmic contacts 163 and 165, and the gate insulation layer 140.

The data lines 171 transfer a data signal and extend in a substantially vertical direction, thereby crossing the gate lines 121 and the storage electrode lines 131. Each data line 171 includes a plurality of source electrodes 173 extending toward the gate electrodes 124 with a 'U' shape, and, in one exemplary embodiment, a wide end 179 for connected to another layer or an external driving circuit. In an exemplary embodiment wherein the data driving circuit is integrated with the substrate 110, the data line 171 may extend to thereby directly connect thereto.

The drain electrodes 175 are separated from the data lines 171 and face the source electrodes 173 with respect to the gate electrodes 124. In the present exemplary embodiment, each drain electrode 175 includes one end portion having a large area for contacting with another layer and another end portion disposed on a gate electrode 124 and partly enclosed by a source electrode 173.

A gate electrode 124, a source electrode 173, and a drain electrode 175, along with a semiconductor 154, form a thin film transistor having a channel formed in the semiconductor 154 disposed between the source electrode 173 and the drain electrode 175.

In the present exemplary embodiment, the ohmic contacts 163 and 165 are interposed only between the underlying semiconductors 154 and the overlying data lines 171 and drain electrodes 175 thereon, and reduce the contact resistance therebetween. The semiconductors 154 include a plurality of exposed portions that are not covered with the data lines 171 and the drain electrodes 175, such as portions located between the source electrodes 173 and the drain electrodes 175.

The gate electrodes 124, source electrodes 173, drain electrodes 175 and semiconductors 154 form a plurality of thin film transistors (TFTs) on the insulating substrate 110.

A passivation layer 180 is formed on the data conductors 171 and 175 and the exposed semiconductors 154. In one exemplary embodiment, the passivation layer 180 is made of an inorganic insulator, an organic insulator, or a double-layered structure including an inorganic insulator and an organic insulator. In one exemplary embodiment, the passivation layer 180 may be flattened.

The passivation layer 180 includes a plurality of recess portions 60. The recess portion 60 includes first lower and upper recess portions 61a and 61b, second lower and upper recess portions 62a and 62b, third lower and upper recess portions 63a and 63b, and fourth lower and upper recess portions 64a and 64b.

The passivation layer 180 has a plurality of contact holes 182 and 185 exposing the end portions 179 of the data lines 171, and the end portions of the drain electrodes 175, respectively, and the passivation layer 180 and the gate insulating layer 140 have a plurality of contact holes 181 exposing the end portions 129 of the gate lines 121.

A plurality of pixel electrodes 191, and a plurality of contact assistants 81 and 82, exemplary embodiments of which may be made of a transparent conductor such as ITO or IZO or a reflective conductor such as Al, Cr, or alloys thereof, are formed on the passivation layer 180.

The pixel electrodes 191 are physically and electrically connected to the drain electrodes 175 through the contact holes 185 such that the pixel electrodes 191 receive the data voltages from the drain electrodes 175. The pixel electrodes 191 supplied with the data voltages generate electric fields in cooperation with a common electrode 270 supplied with a common voltage and provided in the common electrode panel 200, which determine the orientations of liquid crystal molecules in a liquid crystal layer 3. The polarization of light passing through the liquid crystal layer 3 varies according to the direction of the liquid crystal molecules. The pixel electrode 191 and the common electrode 270 form a liquid crystal capacitor, which stores applied voltages after turn-off of the TFT.

An additional capacitor called a "storage capacitor", which is connected in parallel to the liquid crystal capacitor, is provided for enhancing the voltage storing capacity. The storage capacitors are implemented by overlapping the pixel electrodes 191 with the storage electrode lines 131 as well as the storage electrodes 137a and 137b.

Each pixel electrode 191 has a substantially rectangular shape having four main edges substantially parallel to the gate lines 121 and the data lines 171, and chamfered left corners. The chamfered oblique sides 90a and 90b of the pixel electrodes 191 are inclined with respect to the gate lines 121 by an angle of about 45°; in other words, the chamfered oblique sides 90a and 90b of the pixel electrode 191 are disposed to form an angle of about 45° with the gate lines 121 as seen from a top plan view.

Each pixel electrode 191 includes first and second central cutouts 91 and 92 and is divided into a plurality of partitions by these cutouts 91 and 92. The cutout portions 91 and 92 are each substantially symmetric with respect to a virtual horizontal central line which bisects the pixel electrode 191.

The first central cutout 91 includes a substantially vertical portion and a pair of oblique portions connected to the substantially vertical portion. The substantially vertical portion is disposed substantially perpendicular to the horizontal central line of the pixel electrode 191, and the pair of oblique portions are respectively extended toward the right edge of the pixel electrode 191 from the substantially vertical portion, wherein the oblique portions extend at an angle of about 45° from the substantially vertical portion and at an angle of about 45° with respect to the gate lines 121. Furthermore, the oblique portions are substantially perpendicular to each other.

The second central cutout 92 extends along the horizontal central line of the pixel electrode 191 and has an inlet from the right edge of the pixel electrode 191, which has a pair of inclined edges disposed substantially parallel to the oblique portions of the first central cutout 91.

Accordingly, the lower half of the pixel electrode 191 is substantially partitioned into two lower partitions by the oblique portion of the first central cutout 91. The upper half of the pixel electrode 191 is partitioned into two upper partitions by the oblique portion of the first central cutout 91. In alternative exemplary embodiments, the number of partitions and the number of cutouts can be varied depending on design factors such as the size of pixels, the ratio of the transverse edges and the longitudinal edges of the pixel electrodes, the type and characteristics of the liquid crystal layer 3, and so on.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and complement the adhesion of the end portions 129 and 179 with external devices.

Next, the upper panel 200 will be described in detail.

A light blocking member 220, also called a black matrix, for preventing light leakage is formed on an insulating substrate 210. Exemplary embodiments of the insulating substrate 210 include transparent glass or other similar materials. The light blocking member 220 includes linear portions corresponding to the data lines 171 and other portions corresponding to the TFTs, prevents light leakage between the pixel electrodes 191, and defines a plurality of openings which face the pixel electrodes 191. In one exemplary embodiment, the light blocking member 220 may include a plurality of openings which face, and have substantially the same planar shape as, the pixel electrodes 191.

A plurality of color filters 230 are formed on the substrate 210. The color filters 230 are disposed substantially in the areas enclosed by the light blocking member 220, and may extend substantially along the longitudinal direction along the pixel electrodes 191. In one exemplary embodiment the color filters 230 may represent one of the primary colors, such as red, green, and blue colors.

An overcoat 250 for preventing the color filters 230 from being exposed and for providing a flat surface is formed on the color filters 230 and the light blocking member 220. In alternative exemplary embodiments, the overcoat 250 may be omitted.

A common electrode 270 is formed on the overcoat 250. In one exemplary embodiment, the common electrode 270 is made of a transparent conductive material, exemplary embodiments of which include ITO and IZO, and has a plurality of sets of cutouts 70.

A set of cutouts 70 faces the pixel electrode 191. The cutouts 70 include a lower cutout 72a, a center cutout 71, and an upper cutout 72b. Each of the cutouts 71-72b is disposed between adjacent cutouts 91-92 of the pixel electrode 191 or between the cutout 92 and the chamfered edges 90a and 90b of the pixel electrodes 191. In addition, each of the cutouts 70 has at least one oblique portion extending substantially parallel to the oblique portion of the first central cutout 91 of the pixel electrode 191. Each cutout 70 is substantially symmetric with respect to the above-described transverse line bisecting the pixel electrode 191.

Each of the lower and upper cutouts 72a and 72b includes an oblique portion extending approximately from a left edge of the pixel electrode 191 to approximately a lower or upper edge, respectively, of the pixel electrode 191. Each of the lower and upper cutouts 72a and 72b also include transverse and longitudinal portions extending from respective ends of the oblique portion along edges of the pixel electrode 191, overlapping the edges of the pixel electrode 191, and making obtuse angles with the oblique portion.

The center cutout 71 includes a central transverse portion extending approximately from the left edge of the pixel electrode 191 along the transverse central line of the pixel electrode 191, a pair of oblique portions extending from an end of the central transverse portion approximately to a right edge of the pixel electrode 191 and making obtuse angles with the central transverse portion, and a pair of terminal longitudinal portions extending from the ends of the respective oblique portions along the right edge of the pixel electrode 191, overlapping the right edge of the pixel electrode 191, and making obtuse angles with the respective oblique portions.

The number of cutouts 70 may be varied depending on design factors, and the light blocking member 220 may also overlap the cutouts 70 to block light leakage through the cutouts 70.

In one exemplary embodiment at least one of the cutouts 70 and 90 may be substituted with protrusions (not shown) or depressions (not shown). In one exemplary embodiment, the protrusions may be made of an organic or inorganic material and disposed on or under the field-generating electrodes 191 or 270. In either exemplary embodiment, the cutouts 70 and 90, or the protrusions (not shown) or depressions (not shown) form inclination direction determining members which determine an inclination direction of the liquid crystal molecules in the LCD.

The recess portion 60 of the passivation layer 180 is disposed between the cutout 90 of the pixel electrode 191 or the chamfered edges 90a and 90b and the cutout 70 of the common electrode 270. That is, the first lower and upper recess portions 61a and 61b are disposed between the central cutout 71 of the common electrode 270 and the first central cutout 91 of the pixel electrode 191, the second lower recess portion 62a is disposed between the first central cutout 91 of the pixel electrode 191 and the lower cutout 72a of the common electrode 270, the second upper recess portion 62*b* is disposed between the first central cutout 91 of the pixel electrode 191 and the upper cutout 72*b* of the common electrode 270, the third lower recess portion 63*a* is disposed between the lower cutout 72*a* of the common electrode 270 and the chamfered edge 90*a* of the pixel electrode 191, the third upper recess portion 63*b* is disposed between the upper cutout 72*b* of the common electrode 270 and the chamfered edge 90*b* of the pixel electrode 191, and the fourth lower and upper recess portions 64*a* and 64*b* are disposed between the central cutout 71 of the common electrode 270 and the first central cutout 91 of the pixel electrode 191.

Now, the cutouts of the pixel electrode 90, the cutouts of the common electrode 70, and the recess portions of the passivation layer 60 will be described in detail with the reference to FIGS. 6 and 7, and FIG. 3.

Figure 6:
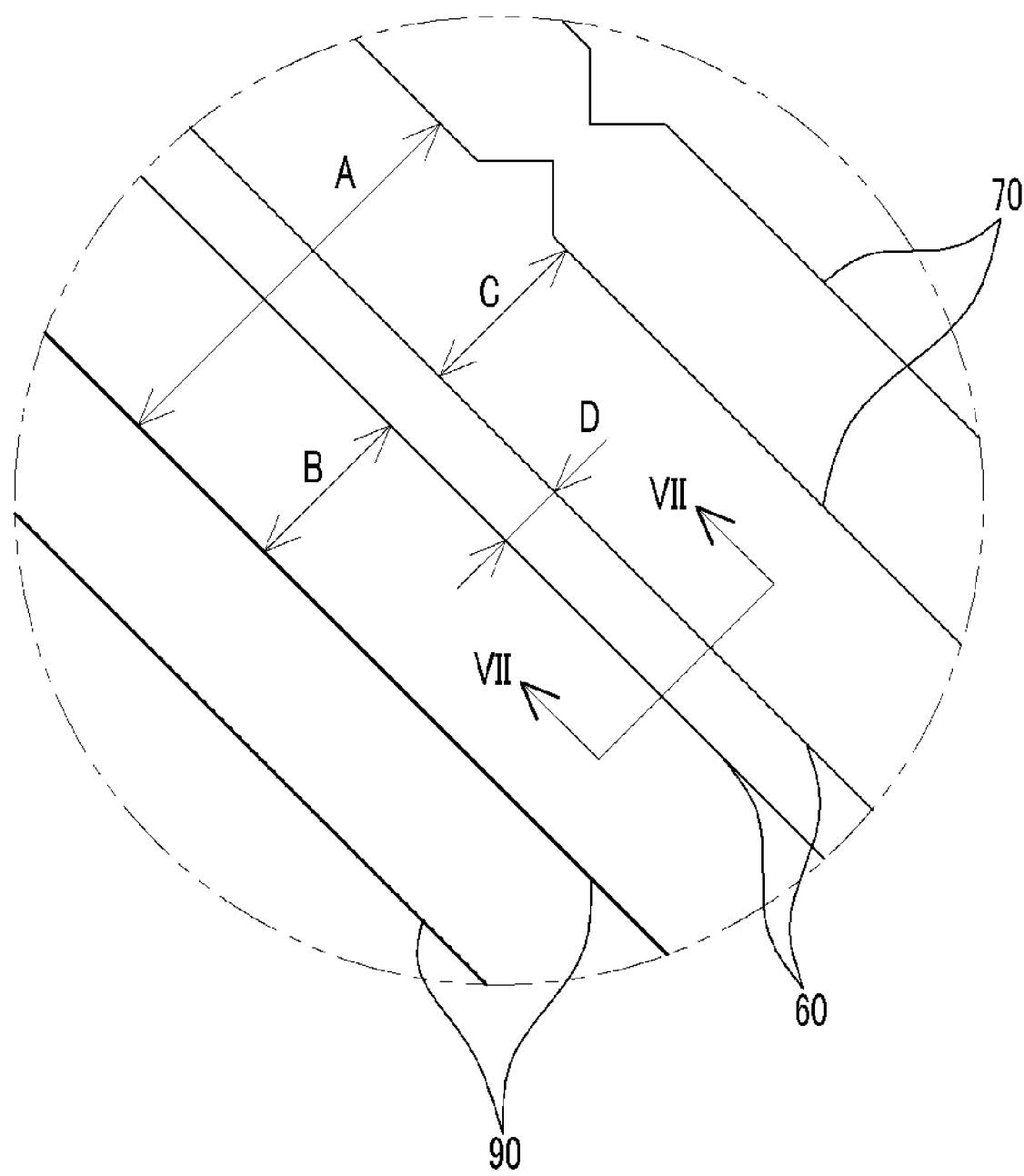
FIG. 6 is an enlarged view of a portion of the exemplary embodiment of an LCD shown in FIG. 3.
Figure 7:
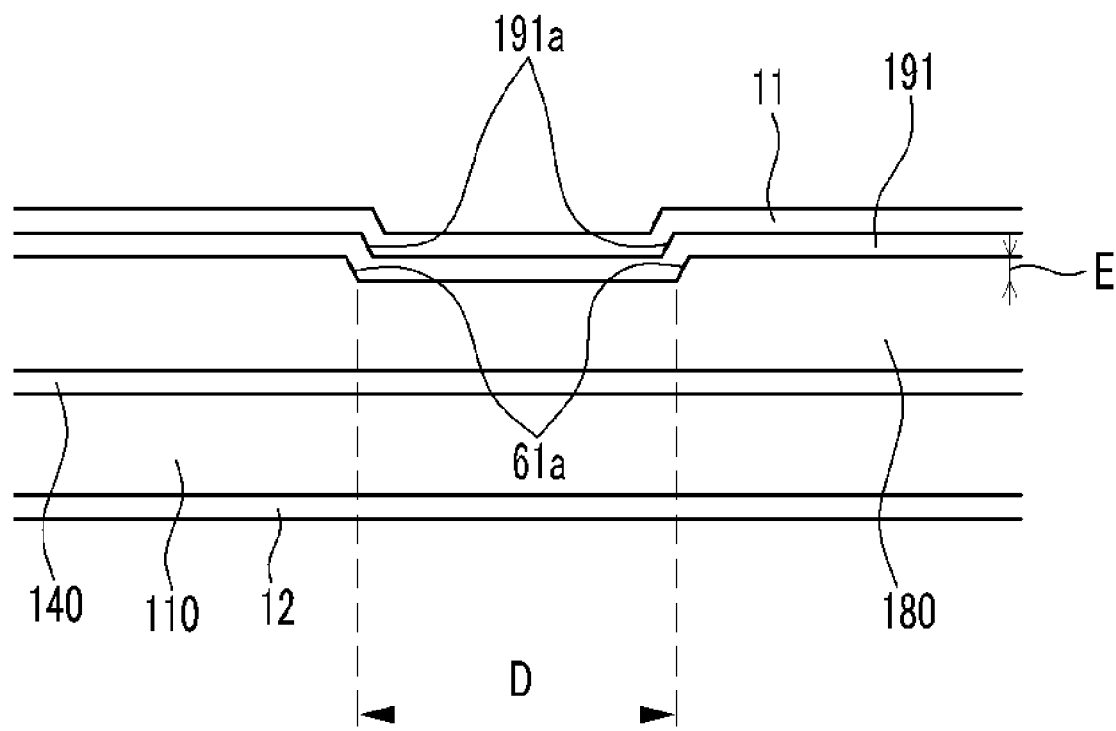
FIG. 7 is a cross-sectional view of FIG. 6 taken alone line VII-VII.

FIG. 6 is an enlarged view of the dotted circle portion of the exemplary embodiment of an LCD shown in FIG. 3, and FIG. 7 is a cross-sectional view of FIG. 6 taken alone line VII-VII.

Referring to FIGS. 6 and 7, the recess 60 portion of the passivation layer 180 is disposed between the cutout 90 of the pixel electrode 191 and the cutout 70 of the common electrode 270. A step portion 191*a* is formed in the pixel electrode 191, wherein the step portion 191*a* is aligned with the recess portion 60 of the passivation layer 180. The step portion 191*a* forms an inclination direction assistance member which assists in inclining liquid crystal molecules in an LCD as described in more detail below.

As shown in FIG. 6, in one exemplary embodiment a distance A between the cutout 90 of the pixel electrode 191 and the cutout 70 of the common electrode 270 is more than or equal to about 40 μm in width in order to increase an aperture ratio of the LCD. A distance C between the cutout 70 of the common electrode 270 and the recess portion 60 may be compared with a distance B between the cutout 90 of the pixel electrode 191 and the recess portion 60 to generate a C:B ratio. In one exemplary embodiment, the C:B ratio may be in a range of from about 1:1 to about 1:3. In another exemplary embodiment, the C:B ratio may be in a range from about 1:1 to about 3:1.

In one exemplary embodiment, the width D of the recess portion 60 is in a range of from about 4 μm to about 8 μm, and a depth E of the recess portion 60 is in a range from about 500 Å to about 2500 Å to sufficiently form the step portion 191*a* of the pixel electrode 191.

The cutouts 71 to 72*b* and 91 to 92 of the field generating electrodes 191 and 270 and the sides of the pixel electrodes 191 generate a horizontal component to the generated electric field. The horizontal component of the electric field determines the oblique direction of the liquid crystal molecules by transforming the main electric field.

The horizontal component of the electric field is substantially perpendicular to the sides of the cutouts 70 and 90 and the sides of the pixel electrodes 191.

Most of the liquid crystal molecules in the sub-areas divided by the cutouts 70 and 90, these sub-areas may also be called "domains", are formed to be substantially perpendicular to the primary edges of the pixel electrode 191. Each sub-area is differently affected by the horizontal components of the electric field resulting from the individual configuration of the cutouts 70 and 90 in that particular sub-area. Here, there are four oblique directions corresponding to the sub-areas as described above. Accordingly, because the liquid crystal molecules are oriented in various directions, the reference viewing angle of the liquid crystal display increases.

Here, if the distance between the cutout 90 of the pixel electrode 191 and the cutout 70 of the common electrode 270 is increased, the aperture ratio of the liquid crystal display is also correspondingly increased. In the prior art, the portions disposed away from the cutouts 70 and 90 between the respective cutouts 70 and 90 receive very little influence from the horizontal component of the main electric field that is transformed by the cutouts 70 and 90 and the sides of the pixel electrodes 191. Therefore, in the prior art, the arrangement of the liquid crystal molecules disposed away from the cutouts 70 and 90 is scattered such that texture is generated and the response speed of the liquid crystal molecules is decreased.

However, in the exemplary embodiment of the present invention, the step portions 191*a* are disposed between the respective cutouts 70 and 90 or between the cutouts 70 and the oblique sides of the pixel electrodes 191 such that the electric field is distorted due to the step portions 191*a*. This distortion of the electric field controls the arrangement of the liquid crystal molecules disposed on the corresponding portions. Accordingly, even though the distance between the cutouts 70 and 90 or between the cutouts 70 and the oblique sides of the pixel electrodes 191 is increased to increase the aperture ratio, the generation of texture of the liquid crystal molecules may be prevented and the response speed may be improved.

Again referring to FIGS. 3 and 4, alignment layers 11 and 21 may be formed on insides of the panels 100 and 200, respectively. In one exemplary embodiment, the alignment layers 11 and 21 may be vertical alignment layers.

Polarizers 12 and 22 may be installed on outsides of the panels 100 and 200, respectively. The polarization axes of the two polarizers 12 and 22 may be substantially perpendicular to each other, and in one exemplary embodiment, one axis may be parallel to the gate lines 121. In the exemplary embodiment wherein an LCD is a reflective LCD, one of the polarizers 12 and 22 may be omitted.

An LCD may include at least one phase retardation film (not shown) and a backlight unit (not shown) for providing the polarizers 12 and 22, the panels 100 and 200, and the liquid crystal layer 3 with light.

In one exemplary embodiment, the liquid crystal layer 3 has negative dielectric anisotropy. The liquid crystal molecules of the liquid crystal layer 3 are arranged such that a longitudinal axis of the liquid crystal molecules is substantially perpendicular to the surfaces of the two panels 100 and 200 when an electric field is not applied.

Now, the behavior of the liquid crystal molecules in the exemplary embodiment of an LCD according to the present invention will be described in detail with reference to FIGS. 8A and 8B.

Figure 8A:
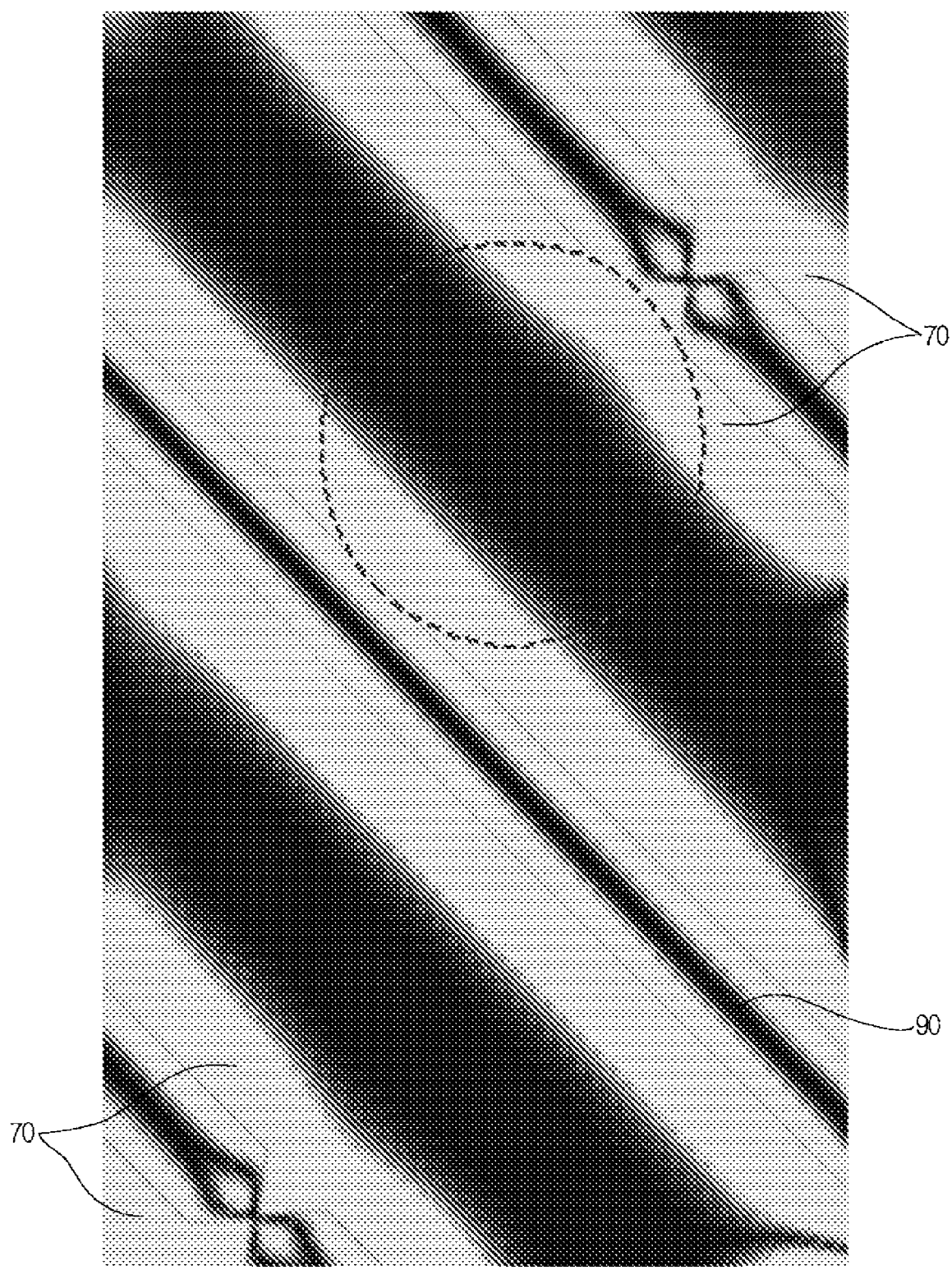
FIG. 8A is a photograph showing a response speed of an LCD according to the prior art.
Figure 8B:
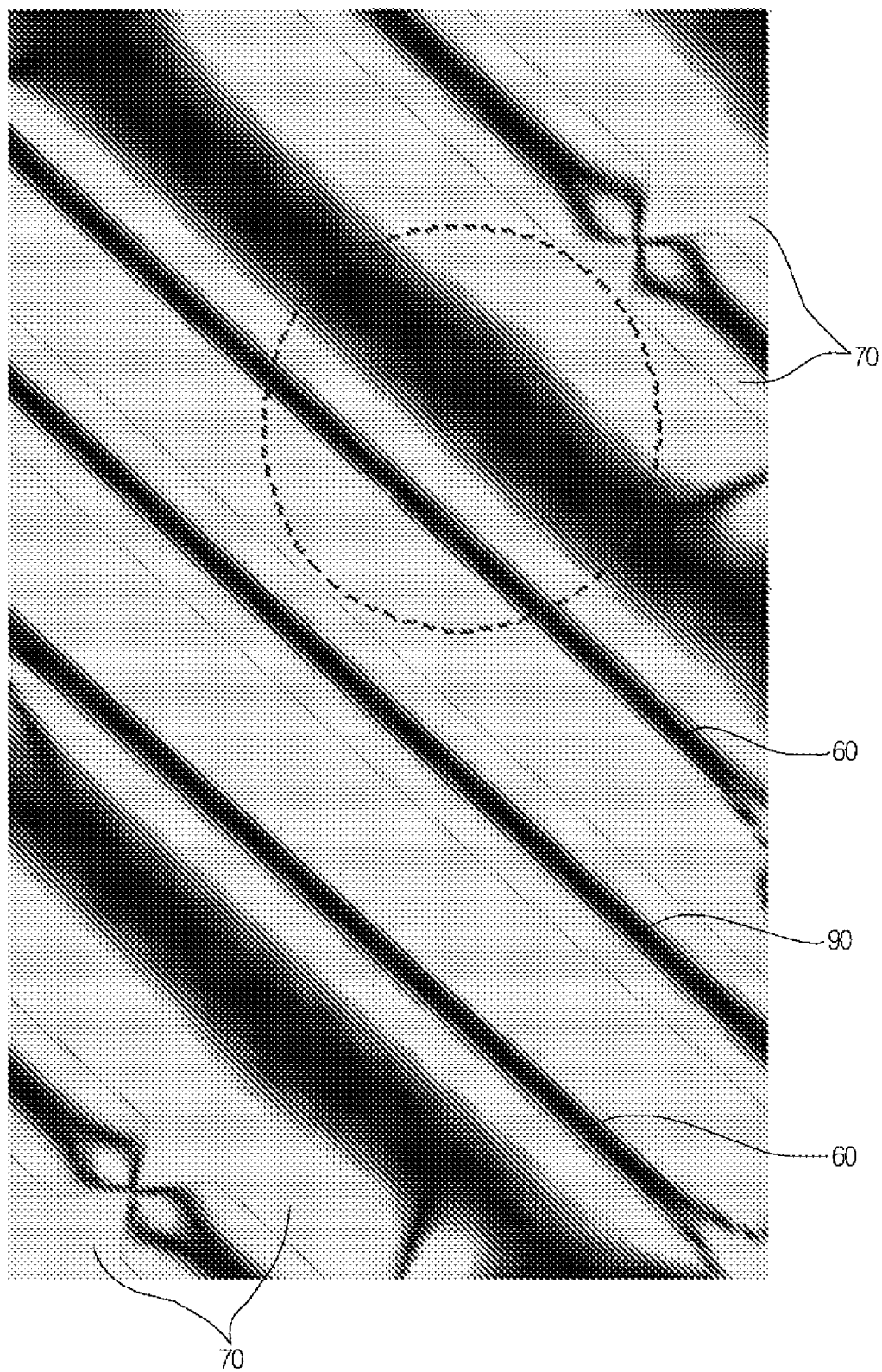
FIG. 8B is a photograph showing a response speed of an exemplary embodiment of an LCD according to the present invention.

FIG. 8A is a photograph showing a response speed of an LCD according to the prior art, and FIG. 8B is a photograph showing a response speed of an exemplary embodiment of an LCD according to the present invention.

As shown in FIG. 8A, an LCD according to the prior art includes cutouts 90 of the pixel electrode and cutouts 70 of the common electrode, but an exemplary embodiment of an LCD according to the present invention includes cutouts 90 of a pixel electrode, cutouts 70 of a common electrode, and recess portions 60 of a passivation layer 180 disposed therebetween, as shown in FIG. 8B.

In each of FIGS. 8A and 8B, the black colored portions in the circle indicated by the dotted lines are the portions where the liquid crystal molecules are not moved because there is little or no influence from the electric field. Comparing FIGS. 8A and 8B, the widths of the black colored portions in FIG. 8B is narrower than those in FIG. 8A. That is to say, the recess portions 60 between the cutouts 90 of the pixel electrodes and the cutouts 70 of the common electrodes are disposed such that the electric field is further distorted, thereby improving the response speed of the liquid crystal molecules.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the present invention, the aperture ratio of the liquid crystal display may be improved, and the response speed and transmittance may also be improved.

What is claimed is:

1. A liquid crystal display comprising:
a gate line;
a data line disposed substantially perpendicular to the gate line;
a switching element connected to the gate line and the data line;
a pixel electrode connected to the switching element, and having a first inclination direction determining member comprising at least one first oblique portion forming an oblique angle with the gate line and the data line; and
an insulting layer disposed between the data line and the pixel electrode,
wherein the pixel electrode comprises an inclination direction assistance member disposed adjacent to the first inclination direction determining member, and substantially parallel to the first oblique portion on different parallel lines in a plan view, the inclination direction assistance member is a step portion of the pixel electrode defined by a continuous major surface portion of the pixel electrode, and
wherein the insulting layer comprises a recess portion which defines the step portion and is formed directly under the inclination direction assistance member.

2. The liquid crystal display of claim 1, wherein the inclination direction assistance member comprises a recess portion formed in the pixel electrode.

3. The liquid crystal display of claim 2, wherein the width of the recess portion is about 4 μm to about 8 μm.

4. The liquid crystal display of claim 2, wherein the depth of the recess portion is about 500 Å to about 2500 Å.

5. The liquid crystal display of claim 1, further comprising a common electrode disposed substantially opposite to the pixel electrode,
wherein the common electrode comprises a second inclination direction determining member having at least one second oblique portion substantially parallel to the first oblique portion and disposed substantially opposite to the first inclination direction determining member with respect to the inclination direction assistance member.

6. The liquid crystal display of claim 5, wherein a horizontal distance between the first inclination direction determining member and the second inclination direction determining member is substantially equal to or greater than about 40 μm.

7. The liquid crystal display of claim 5, wherein a ratio of a horizontal distance between the second inclination direction determining member and the inclination direction assistance member to a horizontal distance between the first inclination direction determining member and the inclination direction assistance member ranges from about 1:3 to about 1:1.

8. The liquid crystal display of claim 5, wherein a horizontal distance between the inclination direction assistance member and the first inclination direction determining member is smaller than a horizontal distance between the inclination direction assistance member and the second inclination direction determining member.

9. The liquid crystal display of claim 8, wherein a ratio of the horizontal distance between the second inclination direction determining member and the inclination direction assistance member to the horizontal distance between the first inclination direction determining member and the inclination direction assistance member ranges from about 1:1 to about 3:1.

10. The liquid crystal display of claim 8, wherein step portion of the pixel electrode extends to a different height than that of a remaining portion of the continuous major surface portion of the pixel electrode.

* * * * *